Aug. 14, 1928.

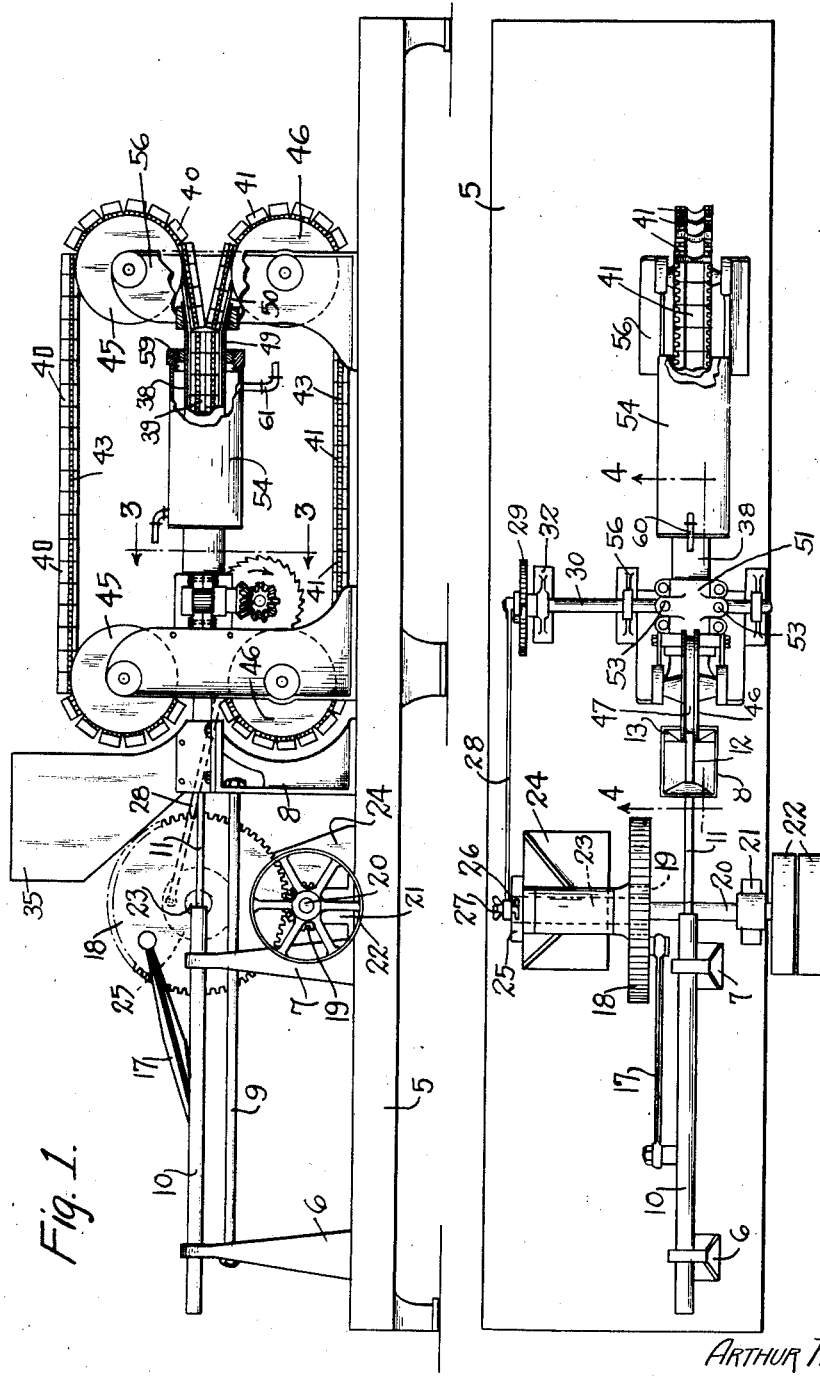

A. F. MULLER 1,680,952

CORK PACKING AND FORMING MACHINE

Filed March 19, 1924

2 Sheets-Sheet 2

INVENTOR
ARTHUR F. MULLER
BY
Maurice Bloch
ATTORNEY

Patented Aug. 14, 1928.

1,680,952

UNITED STATES PATENT OFFICE.

ARTHUR F. MULLER, OF GLENDALE, NEW YORK.

CORK PACKING AND FORMING MACHINE.

Application filed March 19, 1924. Serial No. 700,206.

This invention relates to cork packing and forming machines, and in particular to a type in which the cork granules are formed into a bar member to be subsequently sliced for any desired purposes.

A particular object of the invention is to provide a cork packing machine in which the packing plunger moves substantially the same distance during the packing operation. In machines heretofore built, the packing of the cork has been done in a long tube, the packing being gradually done from the bottom of the tube upwardly. This method has required a plunger which will move a shorter downward distance each succeeding time and as a result there has been not only a waste of power, but valuable time consumed in the packing operation.

When the cork granules are forced through a tubular member, as heretofore done their packing requires an enormous pressure due to the high co-efficient of friction of the cork.

One of the objects of my invention, therefore, is to not only eliminate the unnecessary retractile movement of the packing plunger, but to also reduce the power necessary to properly pack the cork in a tubular form.

A further object is to provide a machine in which the molding tube is made up of a series of separable link members which will allow the cork to be formed therein, and tamped to any desired density, the links forming the mold being movable away from the plunger so that the packing of the cork takes place always at the same point.

A further object is to provide a mold confining tube through which the links may be moved and maintained in registering position to form a completed mold for the cork granules.

A further object is to provide means whereby the molding tube may be advanced as the cork is packed, so that a variation of the movement of the molding tube longitudinally will provide a variation in the density of the packed cork.

A further object is to provide a machine in which the forming of the cork into a rod may be carried on continuously, and in which the rod while being formed may be baked so that handling of the cork rod may be dispensed with.

Figure 4:
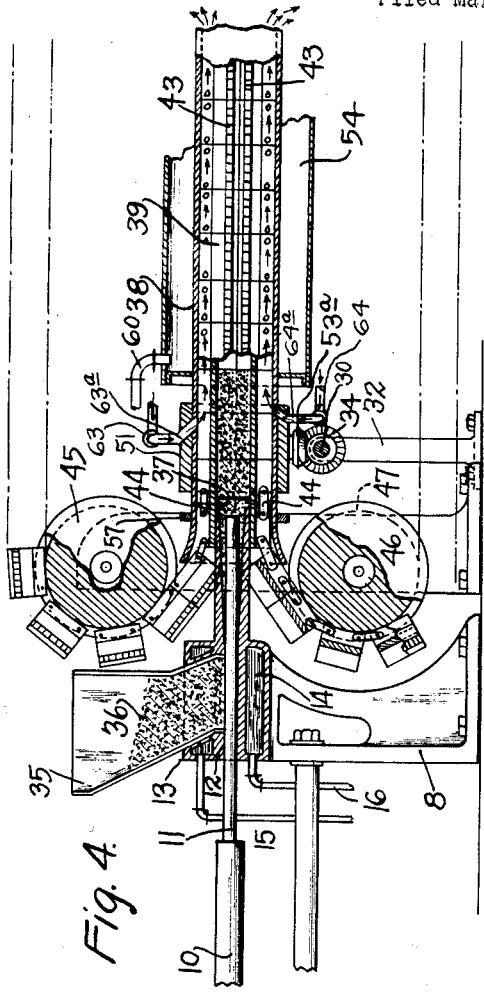
Figure 6:
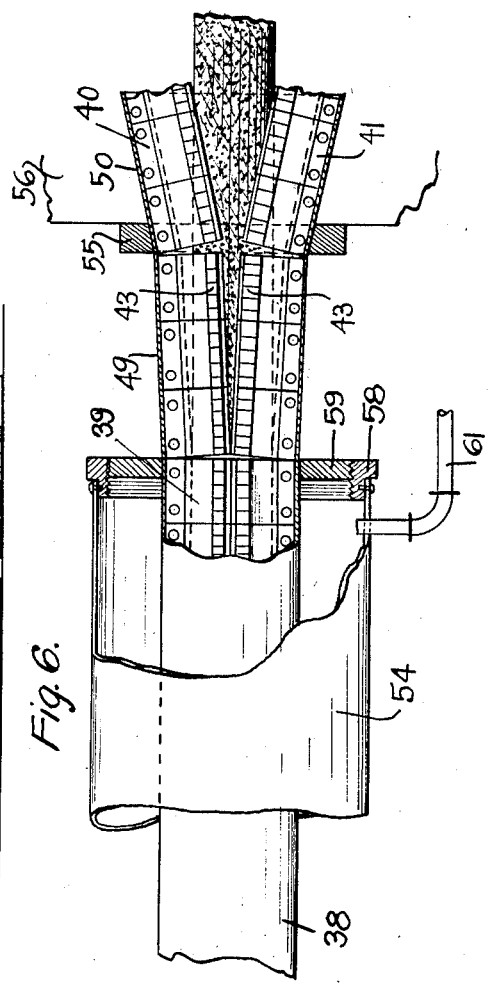
Figure 3:
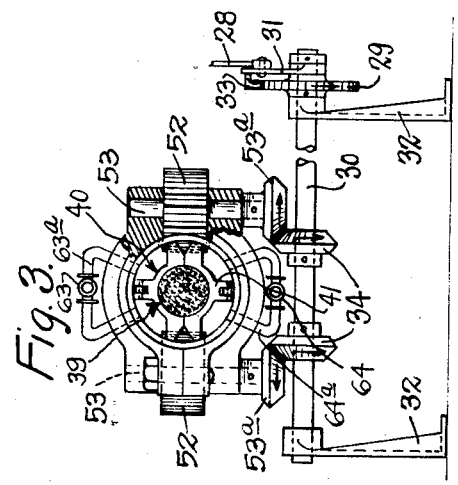
Figure 5:
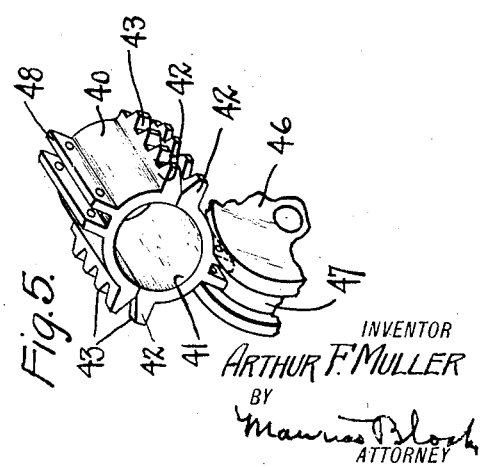

Referring to the drawings wherein I have shown a preferred embodiment of my invention, Fig. 1, is a view in side elevation of a machine constructed in accordance with my idea, Fig. 2, is a top plan view of the machine as seen in Fig. 1, the hopper portion, and the upper chain carrying members being omitted to more clearly disclose other parts, Fig. 3, is a section taken on the line 3—3 of Fig. 1 and shows the means for advancing the links in unison which make up the molding tube, Fig. 4, is a section on the line 4—4 of Fig. 2, and shows the packing plunger and molding tube with a portion of a molded rod formed therein, Fig. 5, is a view in perspective of two of the links which go to make up the molding tube, the lower of which is shown in position in the groove of a pulley over which the links ride, and Fig. 6, is a view in side elevation of a part of the discharge end of the machine, the same being shown partially in section to disclose the flared mouth of the mold confining tube which relieves the pressure on the completed cork rod.

Referring more in detail to the invention, 5 indicates a base upon which are mounted the standards 6, 7 and 8 connected by the brace rod 9. The upper end of the standards 6 and 7 slidably carry the plunger operator 10. the end of which is reduced as at 11, to form a packing plunger which operates through a suitable bore 12, in a hopper holding casting 13, the interior of which surrounding the plunger is hollowed as at 14, to provide a water jacket having a suitable outlet 15 and inlet 16, the purpose of which will be hereinafter described.

The plunger operator 10 is connected by a link 17 to a large gear 18, which in turn is driven by a pinion 19, carried on a shaft 20, this shaft being journaled in a suitable bracket 21, and carrying on its outer end the belt pulleys 22.

The gear 18 is secured to a shaft 23, journaled in the upper end of a bracket 24, the shaft carrying at its outer end, the disk 25, in which is cut a suitable T slot 26, in which is held, through the medium of a thumb screw 27, a ratchet operating link 28. The throw of the ratchet can be adjusted by moving the end of the link 28 toward and away from the center of the disk 25 in the T slot 26. The ratchet wheel 29, is secured to a cross shaft 30, and is disposed between the loosely mounted ratchet arm 31, and the standard 32. With this arrangement, it can be seen that the ratchet arm 31 has a free pivotal movement on the shaft 30, and carries the ratchet pawl 33 in a forward and backward movement over the teeth of the ratchet 29, or with them, whichever the case may be. A forward movement of the link 28 will of course revolve the ratchet wheel 29, in the direction shown in Figs. 1 and 3, to revolve the shaft 30, and its attached bevelled gears 34.

In the casting 13, there is disposed a suitable hopper 35, from which the cork granules 36, are fed into the bore 12, in front of the packing plunger 11, when the latter has been withdrawn to allow the granules 36, to fill the bore in front thereof. A forward movement of the plunger 11 forces the granules 36 into the internally flared throat 37, which is formed integrally with the hopper holding casting 13.

The throat extends into the open flared end of a mold confining tube 38, where the end of said throat is surrounded by the opposing portions of the mold tube 39. This molding tube 39 is made up of a series of connected links which are formed in halves 40 and 41, (see Fig. 5), to produce when together a tubular member. The halves are provided with horizontal side fins 42, which are cut to provide teeth 43. These teeth in both sets of fins match as do the ones on the opposite side of the links. Each set of links are held together by connecting straps 44, and one chain of half-links are arranged so that they travel over the upper set of pulleys 45, while the opposing set of half links travel over the lower pulleys 46.

The pulleys are provided with a central groove 47 in which fits the strap holding fins 48, formed on each of the half links. Particular attention is directed to the fact that the ends of all the fins 42 and 48, are cut on a radius to match the radius of the holding tube so that these links would then come together as is shown in Fig. 4, and will form not only the tube about the end of the throat 37, but will also fit exactly into the mold confining tube 38, through which they are adapted to travel in the relative position to each other as shown in Fig. 5. When they are travelling through the mold confining tube, they are, of course, close together so that the whole series of links passing from one end of the confining tube to the other form the continuous molding tube 39 above referred to. At the discharge end of the machine, the mold confining tube is tapered slightly as at 49, beyond which it has a greater flare 50. This taper 49, which is very gradual, allows the links to draw slightly apart away from the cork rod which has been formed. After the links pass out through the flared mold 50, they continue on their way around their respective pulleys 45 and 46, to be returned to the receiving end of the machine again.

In order to advance the links, (or as they may be more properly called in the working position, the molding tube), I provide a housing 51, for the mold confining tube, in which may be also held gears 52, at the diametrical opposite sides of the mold confining tube which are secured to the vertical shaft 53, carried in the housing and operated through the medium of bevelled gears 53ª, secured at their lower ends, the bevelled gears, being in turn operated by the bevelled pinions or gears 34, hereinbefore described.

Through a suitable opening in the sides of the mold confining tube, the gears 52, mesh with the teeth 43 formed in the sides of the links. These teeth, when the links form the molding tube substantially form a rack which may be operated upon in the usual manner by the gears 52, to advance the molding tube. This advance of the molding tube, as has been before stated, may be varied by the throw imparted to the connecting link 28, by reason of its adjustment on the disk 25.

The operation of the plunger 11 being constant, the adjustment in density of packing the cork granules in the molding tube is regulated by the speed with which the molding tube advances; thus, if the molding tube moves a greater distance after each movement of the plunger, it will be apparent that the cork granules will have more room and will, of course, not be packed so tightly as if the molding tube had only moved a short distance. It can be seen, however, that the packing always takes place at the end of the throat 37, the flare in the same being provided for the purpose of allowing the material to expand while being shoved into the mold.

The closeness of the fit of the molding tube about the end of the throat 37, prevents any of the cork granules from getting therebetween. Also the high friction resistance caused by the expanding tendency of the cork, of the link fins with the walls of the mold confining tube prevents any possible space being left between the links due to wear or other causes. Also, the friction of the moving parts through the mold confining tube is reduced to a minimum by the fins which only contact with the inner surface of the mold confining tube at eight small points.

The mold confining tube is surrounded throughout a portion of its length by a suitable jacket 54, through which may be passed steam or any other suitable heating agent, so that the cork will be baked during its passage through the mold confining tube. The granules are, of course, mixed with a suitable binder so that the same when baked will adhere. In order to prevent the cork granules from becoming hot while they are in the bore 12, which they are apt to do should the heat from the jacket 54, be transferred through the various metal parts to the throat 37, I provide a water jacket 14, above referred to in the casting 13, which will not only keep the hopper cool, but also the casting 13, the plunger 11 and the throat 37, to prevent solidifying of the cork granules.

The forward end of the mold confining tube 38 is held in a suitable ring 55, which is held in the upright 56 which supports the pulleys 45 and 46, the forward end of the tube being held in a similar ring 57. The end of the jacket 54 is provided with an internally threaded flange 58 which holds in threaded relation, a cover 59, which closes the jacket. A suitable inlet 60, and outlet 61 are also provided in the jacket.

When the hopper has been filled with cork granules 36, the same fall into the bore 12, and are pushed forwardly by the plunger 11, into the throat 37, where they are allowed to expand due to the taper of the throat. From the throat they are compacted adjacent the front thereof, and in the molding tube which has been formed by the coming together of the links. It will be noted that these links come together and form a tube which overlaps the end of the throat 37, and fits closely therearound, so that no cork granules can work rearwardly of the throat outlet. The packing takes place at substantially the same point each time, but the movement of the chain caused by the ratchet arm 28, makes possible the variation in density of the cork rod.

While I have used a mold confining tube 38, I wish it to be understood that other suitable means may be used for holding the links in position to form a tube which will allow of their travel with a minimum of friction, at the same time preventing their opening when acting as a mold for the compressed cork.

The taper at the discharge end of the mold confining tube may be as long as desired, so that the links may come away from the cork rod very gradually.

Particular attention is called to the fact that the mold conveys the cork rod and may be of any desired length and shape for molding rods of varying shapes and cross-sections.

To avoid gas or vapor pockets within the cork rod during the baking process, it is necessary to remove the stagnant saturated air that will have a tendency to remain in the mold confining tube about the mold itself and in order to do this I provide an air draught under low pressure which is injected into the mold confining tube at the mold feeding mechanism, through suitable air lines 63 and 64 from each of which there branches the inlets 63ª and 64ª, it being noted that these inlets open into each of the hollow spaces between the fins of the mold forming links so that a draught of moving air bathes the mold exterior and removes therefrom the stagnant saturated air, vapors and gases which tend to retard the efficient baking of the cork rod.

The air current, it will be noted travels as indicated in Figure 4 by the small arrows and discharges into the atmosphere at the discharge end of the machine.

My invention, in its broadest aspects, is not limited to the particular constructions shown, nor to any particular constructions or arrangements of parts by which it has been, or may be, carried into effect, since many changes and alterations may be made in the structures shown without departing from the principles of the invention, and without sacrificing its chief advantages.

Having described my invention, what I claim is:

1. In a cork packing machine, a plurality of chains, the links of which when brought together form a tubular mold, radially disposed teeth on said links, and gears for engaging the teeth of said links to advance the mold.

2. In a cork packing machine, a movable tubular mold in which cork is compressed, a compression plunger, means for operating said plunger, a stationary throat member extending into said mold in which said plunger operates, and means for allowing a momentary expansion of the cork during a compression movement of said plunger.

3. In a cork packing machine, a plurality of separable semi-circular mold forming links, a tubular housing for maintaining said links in tubular mold forming relation, and means whereby said links may be allowed to gradually separate near the discharge end of the machine.

4. In a cork packing machine, a plurality of separable tubular mold forming links, a tubular housing for said links for maintaining them in mold forming position, said housing being outwardly tapered at the discharge end to allow of a gradual separation of said links.

5. In a cork packing machine, a plurality of separable mold forming members, said members comprising semi-circular body portions having radial projections, the ends of said projection having the same radial curvature as said body portions.

6. A cork packing machine comprising a continuous separable mold, a housing for said mold, means for advancing the mold through said housing, a hopper for holding cork granules, a plunger for conveying the granules to the mold and compressing the same therein, means for regulating the density of the cork to be molded, means for baking said molded cork, and means for allowing a gradual separation of the mold from the molded cork at the discharge end of said machine.

7. In a cork packing machine, a mold, means for compressing the contents of the mold, means for baking the mold contents, and means for passing an air current along said mold.

8. In a cork packing machine, a mold, means for heating a portion of said mold, and means for passing an air current along said mold and through the heating zone.

9. In a cork packing machine a mold made up of a series of movable link members, projections on said links, a baking tube through which said links pass, the projection on the links forming passageways between the links and the tube, and means for introducing an air current through said passageways.

In testimony whereof I hereunto affix my signature.

ARTHUR F. MULLER.